United States Patent [19]

Sommer

[11] Patent Number: 4,809,808
[45] Date of Patent: Mar. 7, 1989

[54] MOTOR VEHICLE HAVING AT LEAST TWO DRIVEN AXLES

[75] Inventor: Hans D. Sommer, Graz, Austria
[73] Assignee: Steyr-Daimler-Puch AG, Vienna, Austria
[21] Appl. No.: 210,219
[22] Filed: Jun. 17, 1988

Related U.S. Application Data

[63] Continuation of Ser. No. 42,360, Apr. 24, 1987, abandoned.

[30] Foreign Application Priority Data

Apr. 25, 1986 [AT] Austria ................. 1123/86

[51] Int. Cl.$^4$ .................. B60Q 1/00; B60L 31/00
[52] U.S. Cl. ................... 180/197; 180/248; 180/249
[58] Field of Search ............ 180/197, 248, 249, 141, 180/142; 73/517 A, 517 R; 280/432

[56] References Cited

U.S. PATENT DOCUMENTS

| | | | |
|---|---|---|---|
| 3,295,377 | 1/1967 | Richard | 73/517 A |
| 3,719,246 | 3/1973 | Bott | 180/197 |
| 4,484,653 | 11/1984 | Horikoshi | 180/197 |
| 4,538,700 | 9/1985 | Suzuki | 180/248 |
| 4,605,087 | 8/1986 | Ashauer et al. | 180/248 |

FOREIGN PATENT DOCUMENTS

| | | |
|---|---|---|
| 3015379 | 10/1981 | Fed. Rep. of Germany . |
| 3317247 | 11/1984 | Fed. Rep. of Germany . |
| 3427725 | 8/1985 | Fed. Rep. of Germany . |
| 3418983 | 11/1985 | Fed. Rep. of Germany . |
| 3430982 | 3/1986 | Fed. Rep. of Germany . |

Primary Examiner—David M. Mitchell
Assistant Examiner—Donn McGiehan
Attorney, Agent, or Firm—Marmorek, Guttman & Rubenstein

[57] ABSTRACT

A motor vehicle comprises at least two driven axles (2, 5). One (5) of said axles can be disconnected from the prime mover (1). In order to prevent a swerving of the vehicle without a need for interrupting the transmission of power to one (5) of the driven axles (2, 5) during each braking operation, the vehicle is provided with a sensor (6) for measuring the angular acceleration of its yawing movement. In response to a rise of the angular acceleration to a predetermined value the sensor (8) causes a clutch control means (15) to disconnect one driven axle (5) from the prime mover (1), or operates means for effecting a pressure drop in the brake system.

6 Claims, 1 Drawing Sheet

MOTOR VEHICLE HAVING AT LEAST TWO DRIVEN AXLES

This is a continuation of application Ser. No. 042,360, filed Apr. 24, 1987, now abandoned.

BACKGROUND OF THE INVENTION

1. Field of the Invention

This invention relates to a motor vehicle having at least two driven axles, means for selectively disconnecting one of said driven axles from the prime mover, and a brake system for braking the wheels of both or all said axles.

2. Description of the Prior Art

If the right-hand and left-hand wheels of motor vehicles having at least two driven axles have greatly different coefficients of friction, a braking of the vehicle may result in a yawing or swerving, i.e., in a turning about the vertical axis of the vehicle, so that the vehicle then exhibits an unstable behavior. In order to avoid this it has been proposed in U.S. Pat. No. 4,605,087 to disconnect one axle, usually the rear axle, from the prime mover before a braking is initiated. But that concept will eliminate the advantage that an all-wheel-driven vehicle will usually exhibit an improved response to braking. Besides, the disconnecting operations will frequently be performed and that the means for performing such operations will be highly loaded whenever they are operated.

SUMMARY OF THE INVENTION

It is an object of the invention to eliminate said disadvantages and to provide a motor vehicle which is of the kind described first hereinbefore and in which a swerving is prevented with relatively simple means without a need for interrupting before each braking operation the transmission of power to one driven axle.

That object is accomplished in accordance with the invention in that the vehicle is provided with a sensor for sensing the lateral angular acceleration which is due to the yawing movement of the vehicle and the sensor controls yaw-reducing means, which either disconnect one driven axle from the prime mover or effect a pressure drop in the brake system in response to a rise of said angular acceleration to a predetermined value.

In that case the disconnection of one driven axle from the prime mover does not depend on the braking action but will not be effected unless a yawing movement is performed which exhibits a certain angular acceleration so that there is actually a risk of swerving. It has been recognized that a swerving can also be prevented in that a pressure drop is effected in the brake system whereas the power transmission between the prime mover and both axles is not interrupted. Because strong yawing movements are rarely performed by vehicles during normal operation, the vehicle will exhibit during a very large part of its operating time the higher retardation which is typical for the response of an all-wheel driven vehicle to braking.

In order to prevent during a normal operation of the vehicle an occurrence of undesired actions of the yaw-reducing means in response to the sensor, e.g., owing to resonant mechanical oscillations, a further feature of the invention resides in that the line for delivering signals from the sensor to the yaw-reducing means incorporates a normally open switch, which is adapted to be closed in response to an operation of the brake pedal.

In that case the sensor and the yaw-reducing means will not become effective unless the angular acceleration has risen to an upper limit during a braking operation.

In a simple and particularly suitable arrangement, the sensor comprises an inert mass, which is pivoted on an approximately vertical axis and is held in an intermediate position by a spring, and sensing elements, which are associated with said inert means and define limits for the angular excursion of the inert mass, and leads for delivering signals to the yaw-reducing means are connected to said sensing elements. It will be understood that the inert mass and the sensing elements may be replaced by mercury switches, which are provided on opposite sides of the vehicle and connected to suitable leads.

Figure 1:
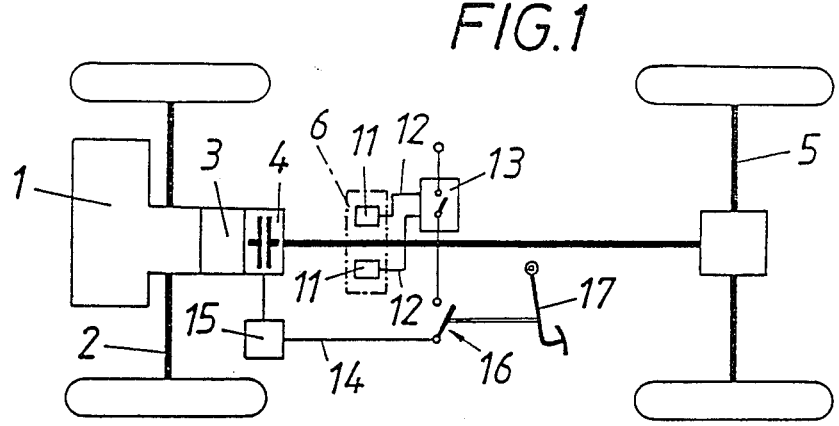
FIG. 1 is a diagrammatic view showing a drive system.
Figure 2:
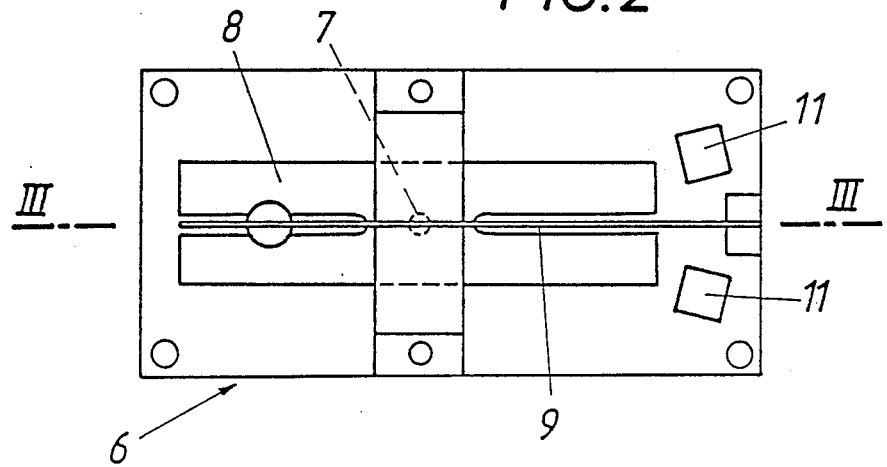
FIG. 2 is a top plan view showing on a larger scale the sensor.
Figure 3:
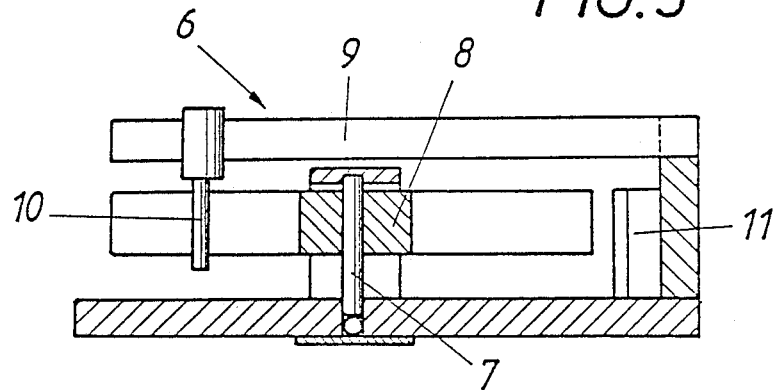
FIG. 3 is a vertical sectional view taken on line III—III in FIG. 2.

An illustrative embodiment of the invention is shown in a simplified form on the drawing.

A motor or prime mover 1 of the vehicle drives by a first power train a front axle 2 and via a second power train comprising a lockable differential or a hydraulic friction coupling 3 and a clutch 4 drives a rear axle 5. It will be understood that a brake system is associated with the wheels of both axles. A sensor generally designated 6 is provided near the center of gravity of the vehicle. That sensor comprises an inert mass 8, which is pivoted on a pivot 7 having a vertical axis and is urged to an intermediate position by a leaf spring 9, which is connected to a pin 10 that extends into a slot formed in the inert mass 8. Two sensing elements 11 are associated with the inert mass 8 and limit the angular excursions of said mass. The sensing elements 11 are connected by signal lines 12 to an electronic switch 13, from which a line 14 leads to clutch control means 15, which are operable to disengage the clutch 4. The line 14 includes a switch 16, which is normally open and is closed in response to an operation of the brake pedal 17.

A predetermined angular excursion of the inert mass 8 in one sense or the other will be detected by one of the sensing elements 11, which will then deliver a signal to the electronic switch 13, which will then actuate the clutch control means 15, provided that the make contact 16 is closed at the same time by an operation of the brake column. The clutch control means 15 will effect a disengagement of the clutch 4 so that the transmission of power to the rear axle 5 is interrupted. The disconnection of the driven axle 5 might be replaced by a pressure drop in the brake system.

It will be understood that the second power train connecting the prime mover to the rear axle 5 and the brake system constitute yaw-inducing means adapted to impart to said vehicle a lateral angular acceleration in response to the operation of said brake system and that the electronic switch 13, the line 14 and the clutch control means 15 constitute yaw-reducing means, which are operatively connected to the yaw-inducing means and are controlled by said sensor to reduce said angular acceleration when, and only when, said sensor has detected a rise of said angular acceleration to a predetermined value. The above-mentioned yaw-reducing means may be replaced by yaw-reducing means for effecting a pressure drop in the brake system.

I claim:

1. In a motor vehicle comprising
a plurality of driven axles,
wheels carried by each of said axles,
a prime mover,
a plurality of power trains for transmitting power from said prime mover to respective ones of said driven axles, and
a brake system associated with and pressure-operable to brake said wheels,
wherein said power trains and said brake system constitute yaw-inducing means adapted to impart to said vehicle a lateral angular acceleration in response to the operation of said brake system,
the improvement residing in that said vehicle comprises a sensor for measuring the angular acceleration of said vehicle,
said vehicle comprises yaw-reducing means, which are operatively connected to said yaw-inducing means and are controlled by said sensor to reduce said angular acceleration when, and only when, said sensor has detected a rise of said angular acceleration to a predetermined value and
wherein said sensor comprises
an inert mass, which is pivoted on an approximately vertical axis,
a spring urging said inert mass to an intermediate position,
two sensing elements arranged to be approached by said inert mass in response to said angular acceleration and to generate signals in response to an approach of said inert mass indicating that said angular acceleration has risen to said predetermined value, and
leads for delivering said signals to said yaw-reducing means,
said yaw-reducing means being arranged to reduce said angular acceleration in response to said signals.

2. A motor vehicle, comprising
first and second driven axles,
wheels carried by each of said axles,
a prime mover,
first and second power trains for transmitting power from said prime mover to said first and second driven axles respectively, said second power train including a clutch,
an actuable brake system associated with and pressure-operable to brake said wheels,
said power trains and said brake system imparting to said vehicle a lateral angular acceleration upon actuation of said brake system,
a sensor in said vehicle for measuring said angular acceleration of said vehicle, and
yaw-reducing means responsive to said sensor and to actuation of said brake system, said yaw-reducing means being operative to disengage said clutch when said brake system is actuated and said sensor detects a rise of said angular acceleration to a predetermined value.

3. The motor vehicle of claim 2 wherein
said brake system includes pressure-reducing means for effecting a pressure drop in said brake system, and
said yaw-reducing means includes means for actuating said pressure-reducing means so as to reduce the pressure in said brake system when said brake system is actuated and said sensor detects a rise of said angular acceleration to a predetermined value.

4. The motor vehicle of claim 2, wherein
said brake system includes a brake pedal which is operable to actuate said brake system,
said sensor includes a line for delivering signals from said sensor to said yaw-reducing means, and
said line includes a make contact which is normally opened and is closed upon operation of said brake pedal.

5. A motor vehicle, comprising
first and second driven axles,
wheels carried by each of said axles,
a prime mover,
first and second power trains for transmitting power from said prime mover to said first and second driven axles respectively, said second power train including a clutch,
an actuable brake system associated with and pressure-operable to brake said wheels,
said power trains and said brake system imparting to said vehicle a lateral angular acceleration upon actuation of said brake system,
a sensor in said vehicle for measuring said angular acceleration of said vehicle, and
yaw-reducing means responsive to said sensor and to actuation of said brake system, said yaw-reducing means including a clutch control connected to said clutch in said second power train, and means connecting said sensor and said brake system to said clutch control, said clutch control disengaging said clutch when said brake system is actuated and said sensor detects a rise of said angular acceleration to a predetermined value.

6. The motor vehicle of claim 5, wherein said means connecting said sensor and said brake system to said clutch control comprises an electric line, said line including a make contact which is actuated upon actuation of said brake system.

* * * * *